Aug. 2, 1949. W. A. MINIX 2,477,889
AIR GAUGE FOR CHECKING INTERNAL THREADS
Filed April 24, 1948
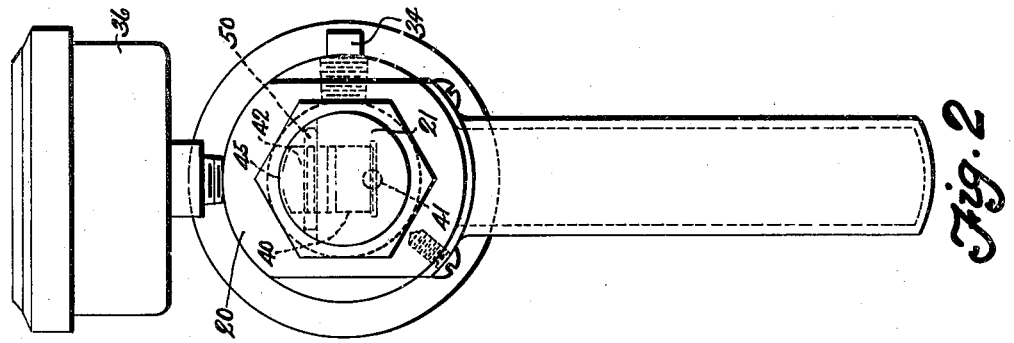
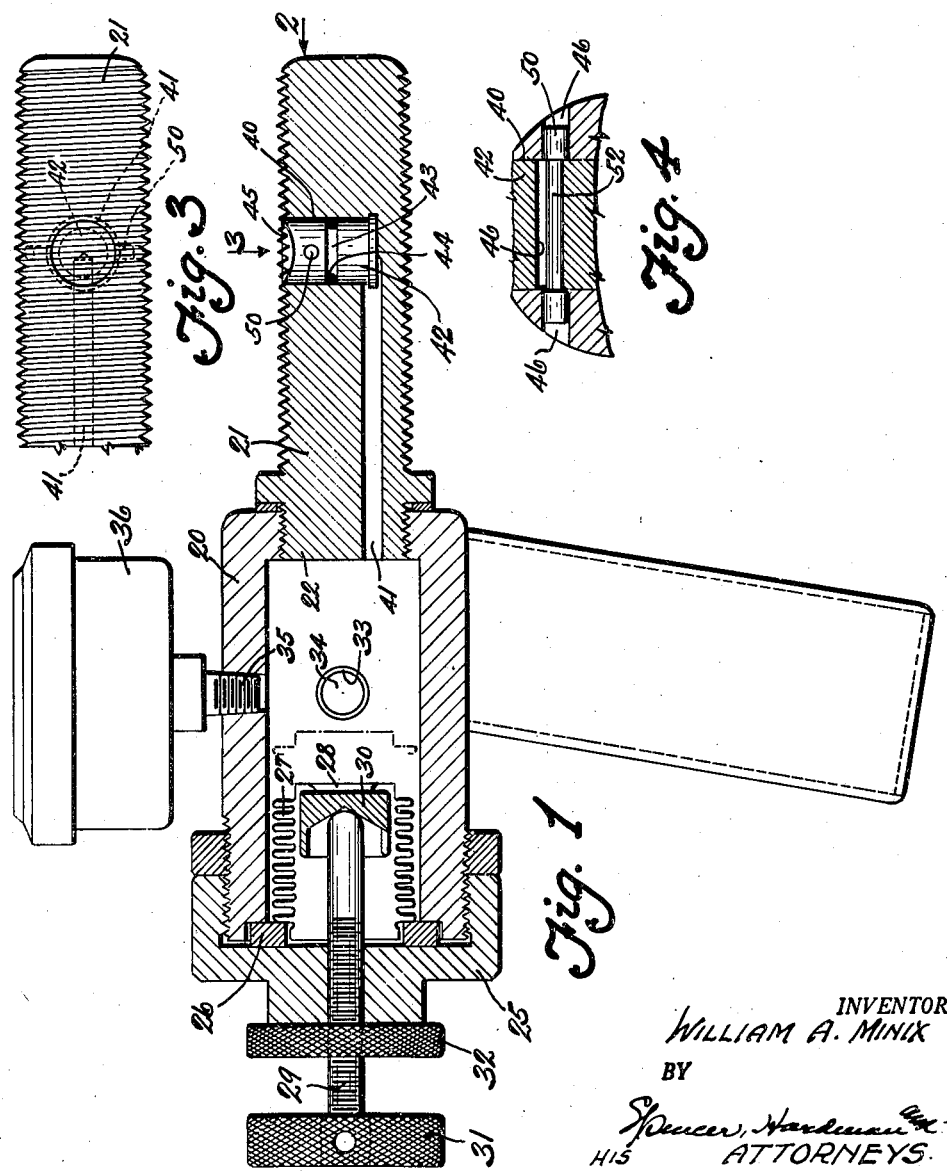
INVENTOR.
WILLIAM A. MINIX
BY
Spencer, Hardman & Fhr
HIS ATTORNEYS.

Patented Aug. 2, 1949

2,477,889

UNITED STATES PATENT OFFICE 2,477,889

AIR GAUGE FOR CHECKING INTERNAL THREADS

William A. Minix, Dayton, Ohio, assignor to General Motors Corporation, Detroit, Mich., a corporation of Delaware Application April 24, 1948, Serial No. 23,102

4 Claims. (Cl. 33—199)

This invention relates to improvements in gauging instruments particularly adapted to gauge threaded objects.

It is among the objects of the present invention to provide a gauge adapted precisely to check threaded objects for variations in size of the threaded portion of the object, character of the threads and any other variations which might render the object unusable.

Further objects and advantages of the present invention will be apparent from the following description reference being had to the accompanying drawings wherein a preferred embodiment of the present invention is clearly shown.

In the drawings:

Fig. 1 is a longitudinal sectional view of one form of gauge constructed in accordance with the present invention.

Fig. 2 is a front end view of the gauge illustrated in Fig. 1.

Fig. 3 is a top view of a portion of the gauge illustrated in Fig. 1.

Fig. 4 is a detail, fragmentary view of the manner of movably attaching the exploratory piston in the snout of the gauge.

Threaded portions of objects, particularly made in large numbers in commercial production, are sometimes faulty, rendering the object unusable for the purpose for which it is produced. Such objects are rejected for various reasons among which are, a tapering, threaded opening, shallow threads providing too small a root diameter of the threaded portion, or mal-formed threads which may result in too tight or too loose a fit for practical use.

The present instrument is fully capable of indicating such objectionable characteristics in a threaded object when it is placed on the snout of the instrument provided with screw threads coinciding with those in the object being tested.

Referring to the drawings, the numeral 20 designates the housing of the device in which fluid, under pressure, is contained. A snout or probe 21 projects from one end of the housing. This snout is illustrated in the present drawings as having a threaded nipple portion 22 received by a threaded opening in the end of the housing. A sealing gasket 23 is placed between a flange on the snout and the adjacent housing wall to prevent fluid leaks at this joint. This form of snout permits removal of one snout for purposes of replacing it by a differently sized or threaded snout. The snout 21 could also be made integral with the housing 20 to eliminate the joint of the illustrated construction, however, in that case the one entire instrument could be used to check only one, certain sized and threaded object.

The end of housing 20, opposite the snout 21, is open, the exterior of this end of the housing being threaded to receive the cover cap 25. The end edge of the open end of housing 20 has an annular recess providing a seat for the ring 26, to which the open end of an expansible and collapsible fluid displacement member shown as bellows 27 is attached. The other end of said member or bellows 27 is closed by end wall 28. An axial, threaded hole in the cover cap 25 receives a threaded rod 29 the inner end of which engages a recessed block 30 to push it against the end wall 28 of the bellows 27. The outer end of rod 29 has an operating knob 31 attached thereto and a lock washer 32 is threaded on the rod so as to be operable into engagement with the cover cap to lock the rod in any adjusted position. A threaded opening 33 in the side wall of housing 20 receives a plug 34 which may be removed to permit fluid to be injected into the interior of the housing through said opening. Another interiorly threaded opening 35 in the side wall of the housing, receives the nipple of the indicator 36 which is adapted to show the pressure of the fluid within the chamber. The threaded shaft 29 may be operated to actuate block 30 against the end wall 28 of the bellows 27 causing it to expand and exert a displacing pressure upon the fluid within the housing which pressure is indicated by the indicator 36. Thus by adjusting the threaded shaft 29 to move block 28, selected pressures may be had within the housing 20.

The probe or snout 21, extending from the housing is ground to a predetermined diameter. In its annular wall surface it has a round recess 40, the center line of which is substantially diametral of the snout. The bottom of this recess is in communication with the fluid containing interior of the housing 20 by means of a duct 41 in the snout.

A piston 42 fits slidably into the recess 40 and has an annular groove 43 substantially midway of its ends in which a packing ring 44 is provided, which frictionally engages the annular wall of the recess 40 to seal against fluid leaks at this point. A pin 50 extending through the snout and piston retains the piston in the recess. The outer end surface of the piston is rounded to coincide with the outer annular wall of the cylindrically shaped snout 21. In the center of said rounded end of the piston there is a lip 45 extending diametrally across it, said lip, when the piston is properly assembled in the snout, extending longitudinally of the snout as shown in Fig. 1.

The piston 42 is assembled in the snout in the following manner; placed in the recess so that its lip 45 is longitudinal of the snout and its outer, domed surface on each side of the said lip coincides with the outer surface of the snout, said piston is held in this position while a transverse hole 46 is formed through the snout and the piston 42 therein. A pin is then driven through this hole, atfer which a predetermined thread 46 is cut in the outer surface of the snout. The extending lip 45 as well as the curved end of the piston will have threads cut into them which coincide with the threads in the surface of the snout. Having threaded the snout and piston end, the holding pin is driven from the transverse hole 46 and another pin 50 is driven in its place. The portions of pin 50 confined in the transverse hole portions 46 in the snout fit substantially tightly therein. However, the portion 52 of pin 50, passing through the piston 42 is of reduced diameter (Fig. 4) by having this portion of the pin 50 within the confines of piston 42 annularly grooved a predetermined depth. This smaller diameter portion of pin 50 cooperates with the transverse opening in the piston to retain the piston in the snout recess 40 and still permit said piston to move relatively to the snout. Pin 50 limits the movement of the piston in either direction radially of the snout. It permits the piston to move outwardly of said recess so that the outer, threaded end of the piston extends beyond the threaded surface of the snout, still maintaining the thread grooves of each in proper circumferential alignment, and also limits the inward movement of the piston so that the inner end of said piston is constantly exposed to the fluid pressure in the duct 41 which urges said piston into its extreme outward position relatively to the snout.

Any suitable handle or bracket 60 may be attached to the housing, by means of which the device is held in position during use. For such use, the screw threaded rod is first actuated to create a certain fluid pressure within the housing 20, indicated by the pressure gauge 36. This fluid pressure is directed through the duct 41 against the bottom end of piston 42 thereby urging said piston to its extreme outward position, limited by the pin portion 52. Now the screw threaded end of the piston 42 extends beyond the screw threaded portion of the snout 21, especially the lip portion 45 on said outer end of the piston.

When an interiorly threaded object to be tested is screwed upon the snout 21, piston 42 will be urged downwardly into recess 40 and as said piston moves into said recess it will exert a secondary pressure upon the fluid underneath, which pressure will be indicated on the gauge as over and above the normal fluid pressure instituted by operation of the screw shaft 29. If the fluid pressure indicated by depression of piston 42 comes within a predetermined range above said normal fluid pressure, then the object tested is acceptacle for use. If, however, there is not sufficient increase above the normal pressure, or if the secondary pressure exerted upon the fluid by piston 42, exceeds the allowable predetermined range of fluid pressures, then the object being tested is rejected because of being too large or two small in diameter respectively.

From the aforegoing description it may be seen that the present gauge is adapted quickly and precisely to check an interiorly threaded object. When applied to such an object the gauge will, among other things, clearly indicate whether or not the threaded opening tapers, the threads are properly formed and of proper depth and the threaded object of proper pitch diameter.

While the embodiment of the present invention as herein disclosed, constitutes a preferred form, it is to be understood that other forms might be adopted.

What is claimed is as follows:

1. A device for testing threaded objects, comprising in combination, a housing containing fluid under pressure; a gauge indicating said fluid pressure; a threaded, testing element on said housing adapted to be applied to a similarly threaded object to be tested; a recess in said threaded testing element; a plug fitting into said recess and slidable therein substantially radially of the element, the outer end of the plug having threads corresponding to and aligning with the threads in said element; means on the element and engaging the plug to limit its movement relative to the said element, whereby the threaded end of the plug may extend beyond the surface of said element a predetermined distance only; and a duct in said element connecting the recess beneath the plug with the fluid containing housing, whereby said plug is urged, by fluid pressure, into its fully extended position relatively to said element.

2. A device for testing threaded objects, comprising in combination, a housing containing fluid under pressure; a gauge indicating said fluid pressure; a cylindrically shaped extension on said housing, provided with screw threads and adapted to have an interiorly threaded object screwed thereupon for testing purposes; a recess in said extension substantially radially thereof; a piston slidable in said recess; a sealing ring on the piston, frictionally engaging the wall of the recess; screw threads on the outer end of the piston, similar to and aligning with the threads on the extension; a pin extending transversely through the extension and the piston, said pin portion passing through the piston being of reduced diameter to permit the piston to move outwardly of the extension so that the threaded surface of the piston may extend a predetermined distance beyond the threaded surface of the extension, the pin preventing rotation of the piston to maintain its screw threads aligned with the screw threads on the extension; and a duct connecting the inner end of the recess with the fluid pressure in the housing whereby the piston is normally urged into its fully extended position relatively to the extension.

3. A device for testing threaded objects, comprising in combination a fluid containing housing having a cylindrically shaped, screw-threaded snout; a cylindrical recess in the snout, diametral thereof; a piston in said recess, the outer end of said piston having screw threads of pitch similar to that of the threads on the snout and aligning with the screw threads on the snout; means in the snout and engaging the piston to prevent its rotation but permitting it to slide in the recess, said means predeterminately limiting the movement of the piston outwardly of the snout; a duct in the snout connecting the bottom of the recess with the housing; a pressure indicator connected with said housing; a piston within the housing; means on the housing and engaging the piston, said means being operative to move the piston to exert a selected pressure upon the fluid in the housing, said fluid pressure urging the piston in the snout into its extreme extended position; and sealing means between the recess and its contained piston.

4. A device for testing threaded objects, comprising in combination a fluid containing housing having a cylindrically shaped, screw-threaded snout; a cylindrical recess in the snout, diametral thereof; a piston in said recess, the outer end of said piston having screw threads of pitch similar to that of the threads on the snout and aligning with the screw threads on the snout; means in the snout and engaging the piston to prevent its rotation but permitting it to slide in the recess, said means predeterminately limiting the movement of the piston outwardly of the snout; a duct in the snout connecting the bottom of the recess with the housing; a pressure indicator connected with said housing; a screw cap forming one end cover for the housing; an expansible and contractible fluid displacement member attached to the screw cap and extending into the housing; and means supported by the screw cap, operative to expand or contract the displacement member to increase or decrease respectively the fluid pressure within the housing, said fluid pressure urging the piston in the snout recess into its extreme extended position relative to the snout.

WILLIAM A. MINIX.

REFERENCES CITED

The following references are of record in the file of this patent:

UNITED STATES PATENTS

| Number | Name | Date |
|---|---|---|
| 1,437,053 | Harrington | Nov. 28, 1922 |
| 2,408,672 | Mennesson | Oct. 1, 1946 |